Oct. 23, 1928.
W. D. HUGHES
1,689,074
TOOL FOR REPAIRING STARTER MECHANISMS
Filed July 13, 1927 2 Sheets-Sheet 1
Fig. I.
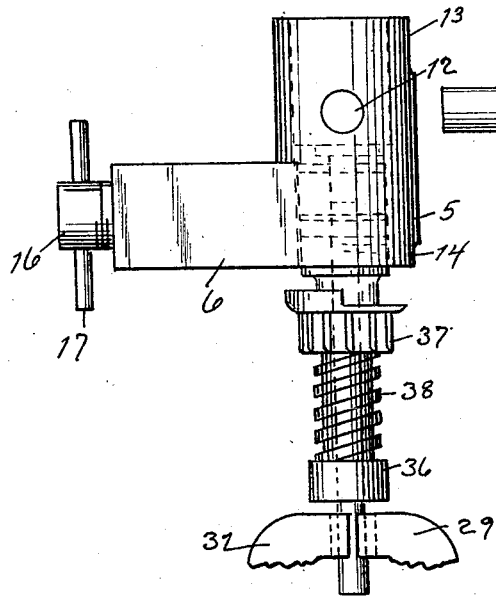
Fig. II.
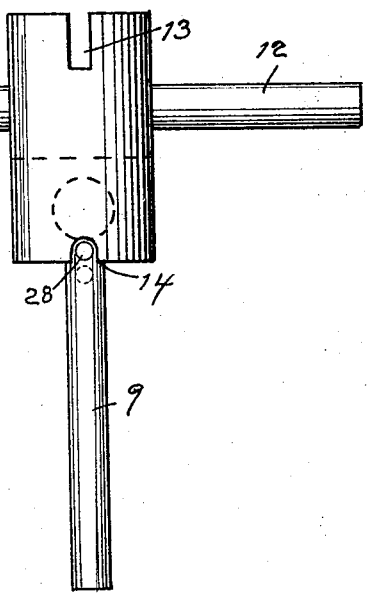
Fig. III.
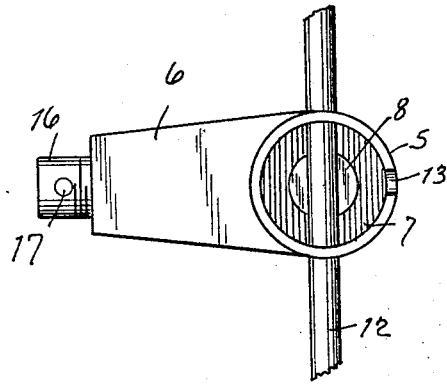
Fig. IV.
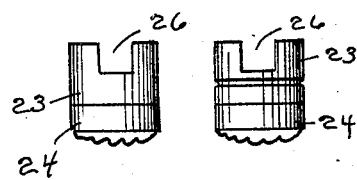
INVENTOR.
W. D. HUGHES
BY *Victor J. Evans*
ATTORNEY.

Oct. 23, 1928.  
W. D. HUGHES  
1,689,074  
TOOL FOR REPAIRING STARTER MECHANISMS  
Filed July 13, 1927  2 Sheets-Sheet 2
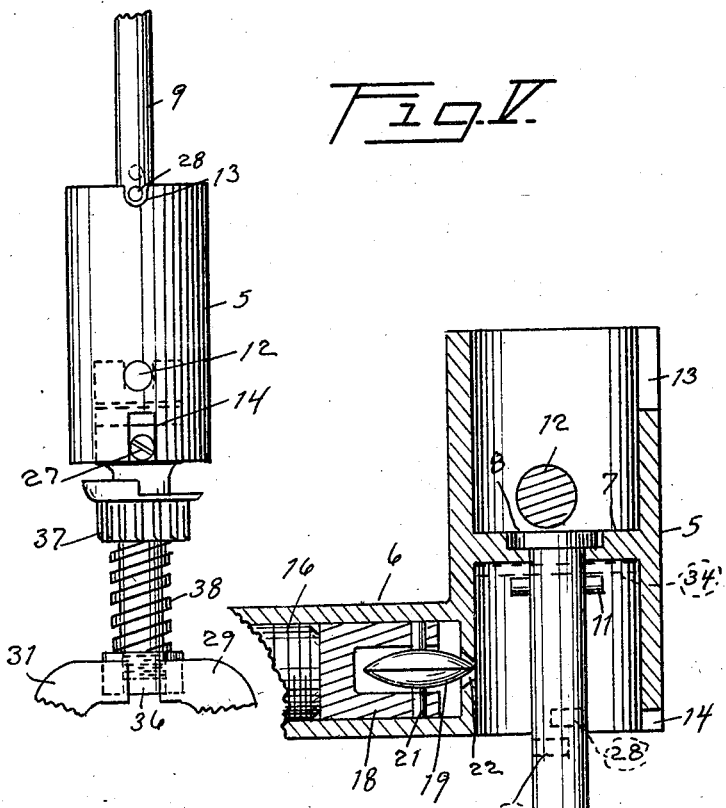
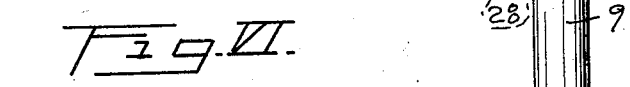
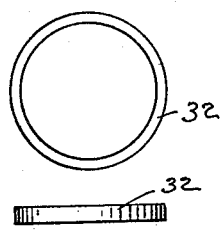
INVENTOR.  
W. D HUGHES  
BY  
ATTORNEY.

Patented Oct. 23, 1928.

1,689,074

UNITED STATES PATENT OFFICE.

WALTER D. HUGHES, OF SANTA ROSA, CALIFORNIA.

TOOL FOR REPAIRING STARTER MECHANISMS.

Application filed July 13, 1927. Serial No. 205,457.

This invention relates to improvements in tools.

The principal object of this invention is to produce a tool for use in repairing Bendix starters.

Another object is to provide a device wherein greater speed is possible than with the present form of tool used for this purpose.

A further object is to produce a tool wherein the crimping action is accurately gauged and accurately performed.

A further object is to produce a tool which may be operated by any mechanic without any particular skill.

A further object is to produce a tool which may be transported in counter-distinction to the ordinary Bendix repair tool which is usually bolted or otherwise secured to a stationary support.

A further object is to provide a tool wherein not only the compression sleeve may be repaired, but also a tool wherein the nipple may be removed for the purpose of permitting the counter-weight gear to be removed for repair.

A still further object is to provide a device which is simple and therefore economical to manufacture.

Other objects and advantages will be apparent during the course of the following description.

In the accompanying drawings forming a part of this specification, and in which like numerals are employed to designate like parts throughout the same, Figure I is a side elevation of my tool as the same appears in use upon a Bendix starter, Figure II is a front elevation of my tool, Figure III is a top plan view of Figure II, Figure IV is a fragmentary detail view showing a compression sleeve before and after crimping.

Figure V is a front elevation of my tool in a reversed position, as the same is applied for removing the nipple.

Figure VI is a fragmentary vertical cross-section of my tool on an enlarged scale, and Figure VII discloses a top and side view of the adjusting washer.

A large number of automobiles employ a starter mechanism which is commonly known as the Bendix drive. This Bendix drive has a compression head which is rotatable with respect to the remainder of the drive and is held upon the Bendix drive as a whole by providing a crimp within the compression head. These compression heads are often broken, with the result that a new head must be placed upon the drive before it is of any value, and it is to accomplish this that I have devised my present invention.

In the accompanying drawings wherein for the purpose of illustration is shown a preferred embodiment of my invention, the numeral 5 designates a casting having an offset portion 6. This casting is bored in such a manner as to form a pair of axial aligned bores separated by a partition 7. This partition 7 serves to position the head 8 of a bolt 9, which carries a pin 11 at a point below the partition.

A handle 12 extends through the casting 5 and overlies the head 8 of the bolt 9. This handle serves to rotate the tool, and at the same time prevents the bolts 9 from being removed from the partition 7. The casting 5 has a slot cut therein as shown at 13 and a similar slot at 14 of smaller dimensions. The purpose of these slots will be later described.

The offset 6 is bored so as to receive a threaded compression screw 16 which is rotated by a handle 17 and is adapted to have its inner end bearing against a plug 18 within which is carried a crimping wheel 19 rotatable upon a shaft 21 carried in the plug 18. This crimping wheel is adapted to extend through an opening 22, the purpose of which will be later seen.

The manner of using my tool is as follows:—

Assuming that it is desired to place a compression head such as designated at 23 of Figure IV, upon a Bendix drive, the end of which is shown at 24, it is first necessary to place the compression member upon the Bendix drive, after which the whole device is slid onto the rod 9 in such a manner that the cut away portion 24 of the compression member straddles the pin 11.

After this the screw 27 is placed in the Bendix drive in such a manner that it will enter one of the holes 28 in the rod 9, which locks the Bendix to the rod 9, after which the rod is clamped in the jaws 29 and 31 in a vise or similar holding implement.

By now turning the compression screw 16 and rotating the same, pressure is brought to bear upon the plug 18 with the result that the crimping wheel 19 is forced against the surface of the compression member. By now grasping the handle 12, and rotating the casting 5, it will be evident that the crimping wheel will be caused to rotate around the compression head which is being held against rotation by the rod 9. In this manner it is possible to crimp the compression head at any point desired.

In some Bendix drives, it is necessary to employ a spacer ring 32 (see Figure IV). This ring is employed as indicated in dotted lines in Figure VI with the result that the head as a whole cannot enter the tool as far as it otherwise would.

When it is desired to remove the nipple 36 from the Bendix, the same is grasped in the jaws of the vise as shown in Figure V after which the tool is employed in a reverse position as shown in this figure. By now inserting the screw 27 so that the same protrudes from the side of the Bendix to form a lug, it will be apparent that by rotating the tool the Bendix as a whole will be unscrewed from the nipple 36 thereby preventing the counter-balance gear 37 from being unscrewed from its thread 38.

It will thus be seen that I have produced a very simple tool for accomplishing the objects above set forth.

It is to be understood that the form of my invention herewith shown and described is to be taken as a preferred example of the same and that various changes relative to the shape, size, material and arrangement of parts may be resorted to without departing from the spirit of the invention or the scope of the subjoined claims.

Having thus described my invention, I claim:—

1. In a tool of the character described, a casting having a pair of axially aligned bores formed therein, a partition separating said bores, a rod carried in said partition and being centrally disposed within one of said bores, a pin positioned within said rod and in close proximity to said partition and a crimping wheel slidably mounted in said casting and adapted to have a portion of its periphery extending into one of said bores.

2. In a tool of the character described, a casting having a pair of axially aligned bores formed therein, a partition separating said bores, a rod carried in said partition and being centrally disposed within one of said bores, a pin positioned within said rod and in close proximity to said partition, a crimping wheel slidably mounted in said casting and adapted to have a portion of its periphery extending into one of said bores, and means for moving said crimping wheel for the purpose specified.

In testimony whereof I affix my signature.

WALTER D. HUGHES.